United States Patent
Rao et al.

(10) Patent No.: US 10,114,582 B1
(45) Date of Patent: Oct. 30, 2018

(54) DYNAMICALLY SELECTING BETWEEN SYNC AND ASYNC REPLICATION MODES

(71) Applicant: EMC IP Holding Company LLC, Hopkinton, MA (US)

(72) Inventors: Vinay G. Rao, Bangalore (IN); Slavik Neymer, Tel Aviv (IL); Arieh Don, Newton, MA (US)

(73) Assignee: EMC IP Holdinig Company LLC, Hopkinton, MA (US)

( * ) Notice: Subject to any disclaimer, the term of this patent is extended or adjusted under 35 U.S.C. 154(b) by 111 days.

(21) Appl. No.: 15/392,165

(22) Filed: Dec. 28, 2016

(51) Int. Cl.
G06F 12/00 (2006.01)
G06F 3/06 (2006.01)
G06F 11/14 (2006.01)

(52) U.S. Cl.
CPC ............ G06F 3/065 (2013.01); G06F 3/0619 (2013.01); G06F 3/0659 (2013.01); G06F 3/0683 (2013.01); G06F 11/1456 (2013.01)

(58) Field of Classification Search
None
See application file for complete search history.

(56) References Cited

U.S. PATENT DOCUMENTS

| | | |
|---|---|---|
| 9,280,555 B1 | 3/2016 | Bono et al. |
| 9,330,155 B1 | 5/2016 | Bono et al. |
| 9,378,261 B1 | 6/2016 | Bono et al. |
| 2012/0042139 A1* | 2/2012 | Coronado ........... G06F 11/2074 711/162 |
| 2015/0261443 A1* | 9/2015 | Wei ........................ G06F 3/0604 711/162 |

OTHER PUBLICATIONS

EMC RecoverPoint Family—Aug. 2013.
EMC VNX Replication Technologies, Nov. 2015.

* cited by examiner

*Primary Examiner* — Brian Peugh
(74) *Attorney, Agent, or Firm* — BainwoodHuang

(57) ABSTRACT

A technique for storing data operates a replication splitter in a host computing device. The host computing device runs an application and monitors write performance from the application to both a data storage array and a replication site. If the monitored performance indicates that writes to the replication site would not significantly slow down the application, the replication splitter operates in synchronous mode, in which the splitter waits to acknowledge writes from the application until it receives confirmation of write completion from both the data storage array and the replication site. However, if the monitored performance indicates that writes to the replication site would significantly slow down the application, the replication splitter operates in asynchronous mode, in which the splitter acknowledges writes from the application as soon as it receives confirmation that the data storage array has completed those writes and without waiting for acknowledgements from the replication site.

21 Claims, 4 Drawing Sheets

DYNAMICALLY SELECTING BETWEEN SYNC AND ASYNC REPLICATION MODES

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Administrators often configure data storage systems to perform replication on arriving host data. For example, a data storage system, also referred to herein as an "array," may include a replication splitter that receives incoming IO (Input/Output) write requests from hosts and mirrors data specified in such IO requests to a replication site, where a second data storage system receives the host data and stores a duplicate copy.

Replication may proceed synchronously or asynchronously. With synchronous replication, the splitter may send data specified in each individual IO write request both to the array and to the replication site. Only after the splitter receives one acknowledgment from the array and another from the replication site does the splitter acknowledge completion of the write back to the host. By comparison, a splitter performing asynchronous replication accumulates data from multiple host writes, sending accumulated data to the replication site in regular updates but out of band with individual IO requests.

SUMMARY

Unfortunately, synchronous replication can significantly reduce write performance. For example, long path lengths, congested networks, and/or slow hardware can delay writes to the replication site and consequent acknowledgements back to the host, slowing down the rate at which the host can issue write requests.

To address this potential reduction in performance, arrays can implement asynchronous replication. For example, an array can store data specified in multiple host writes in non-volatile memory, which may be needed for fault recovery, and ship the data to the replication site on a regular basis. As the shipment of data is out of band with incoming host writes, the hosts generally experience no delays in writing to the array and receiving acknowledgements. This arrangement is itself less than optimal, however, as the array may be configured to perform writes in large increments (e.g., "tracks"), which are much larger than the increments in which hosts generally provide data in IO requests. An array's track size may be 128 KB, for example, whereas a host's write size may be 4 KB. This mismatch places a burden on the array and on associated replication hardware, which may need to ship host data to the replication site in track-sized increments, even though the amount of data shipped may be much smaller. In addition, the array may serve hundreds or thousands of hosts simultaneously, and managing asynchronous replication for such a large number of hosts may be taxing on the array's processing and memory resources.

In contrast with the above-described prior approaches, an improved technique for storing data operates a replication splitter in a host computing device. The host computing device runs an application and monitors write performance from the application to both a data storage array and a replication site. If the monitored performance indicates that writes to the replication site would not significantly slow down the application, the replication splitter operates in synchronous mode, in which the splitter waits to acknowledge writes from the application until it receives confirmation of write completion from both the data storage array and the replication site. However, if the monitored performance indicates that writes to the replication site would significantly slow down the application, the replication splitter operates in asynchronous mode, in which the splitter acknowledges writes from the application once it receives confirmation that the data storage array has completed those writes, with writes to the replication site being queued and shipped to the replication site in batches.

Advantageously, examples of the improved technique dynamically adjust to changing circumstances, such as changes in load on the primary array, network traffic, congestion, and so forth, by automatically switching between synchronous and asynchronous replication, favoring synchronous replication when doing so has little impact on performance, and favoring asynchronous replication when the impact on performance if using synchronous replication would be significant. Also, because the data storage array is not involved in splitting IOs or storing accumulated writes, the burden of handling mismatches between host write sizes and array write sizes is avoided. The data storage array is also relieved of the burden of managing replication sessions on behalf of hundreds or thousands of hosts, as the hosts manage these sessions themselves.

In some examples, replication activities employ one or more replication appliances, which act as SCSI (Small Computer System Interface) targets to the host computing device. The host computing device may be configured as a SCSI initiator. The replication appliances assist in transporting data, e.g., in individual IOs and/or in batches, to the replication site. Some arrangements may provide a first replication appliance near a primary array and another at the replication site, near a secondary array. In some examples, a polling interface is provided between the host computing device and one or more replication appliances. Administrators and/or programs can deposit data in a replication appliance, which the host can retrieve via the polling interface. For example, the host may poll the replication appliance for instructions placed there by the administrator or program, and then respond to those instructions by performing specified actions, such as actions that affect replication. In this manner, administrators and programs can influence how replication is performed by the host, or by any number of hosts connecting to the replication appliance.

In some examples, a similar polling interface is present between the host (or hosts) and the primary array. Using this polling interface, administrator or program actions conducted at the array level can affect how replication is carried out by any number of hosts connecting to the array. The array is thus enabled to act as a centralized location for controlling replication involving multiple hosts, even though the array does not perform splitting of IO requests, as it did in the prior approach.

Certain embodiments are directed to a method of storing host data. The method includes providing a replication splitter in a host computing device, the host computing device coupled to a data storage array over a network. The method further includes configuring the replication splitter to operate in a first mode in which the replication splitter receives write requests specifying respective portions of host data, synchronously sends each write request both to the data storage array and to a replication site, and acknowledges completion of each write request only after receiving confirmation of write completion from both the data storage array and to the replication site. In response to detecting that operating the replication splitter in the first mode slows down write performance by more than a predetermined amount, the method further includes configuring the replication splitter to operate in a second mode in which the replication splitter sends each write request to the data storage array and acknowledges completion of each write request after receiving a confirmation from the data storage array but without waiting for confirmation from the replication site, with writes to the replication site queued and shipped to the replication site in batches.

Other embodiments are directed to a data storage system constructed and arranged to perform a method of storing host data, such as the method described above. Still other embodiments are directed to a computer program product. The computer program product stores instructions which, when executed on control circuitry of a host computing system, cause the control circuitry to perform a method of storing host data, such as the method described above.

The foregoing summary is presented for illustrative purposes to assist the reader in readily grasping example features presented herein; however, the foregoing summary is not intended to set forth required elements or to limit embodiments hereof in any way. One should appreciate that the features described above can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for storing data operates a replication splitter in a host computing device. The host computing device monitors write performance from an application both to a data storage array and to a replication site, and automatically switches between synchronous and asynchronous replication based on whether performing synchronous replication would significantly impair write performance of the application.

Figure 1:
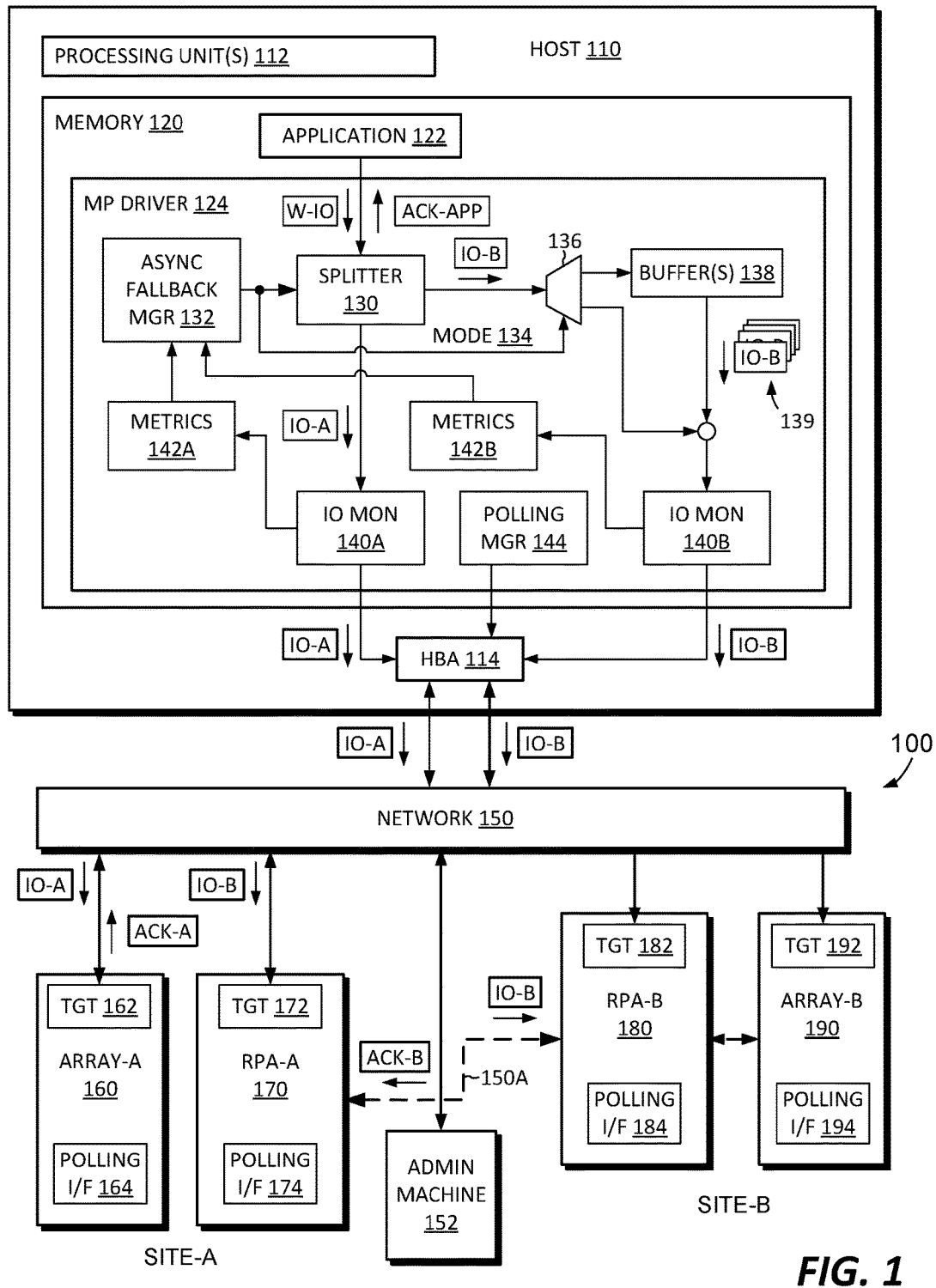
FIG. 1 is a block diagram of an example host computing device operating in an example environment in which embodiments of the improved technique hereof can be practiced.

FIG. 1 shows an example environment 100 in which embodiments of the improved technique hereof can be practiced. Here, a host computing device 110 accesses a data storage system 160 (ARRAY-A) over a network 150. For example, ARRAY-A may store host data accessible by applications running on host 110. ARRAY-A may include one or more storage processors, as well as multiple storage devices, such as magnetic disk drives, electronic flash drives, and the like. ARRAY-A resides at a first site, SITE-A, which includes a local replication appliance 170 (RPA-A). The environment 100 also includes a second site, SITE-B, which may include a replication appliance 180 (RPA-B) and a secondary array 190 (ARRAY-B). An administrative machine 152, such as a computer, may also connect to the network 150, to enable an administrator, administrative program, or other programs, to configure and control arrays 160 and 190 and/or replication appliances 170 and 180. In some examples, the functions of administrative machine 152 may alternatively be provided on processors in any of the arrays or replication appliances, on any computing device, or on any number of computing devices.

The host computing device 110 may be a personal computer, server, workstation, laptop, tablet, smart phone, set-top box, or any computing device capable of running software and accessing a data storage array to perform writes. The network 150 may be any type of network or combination of networks, such as a storage area network (SAN), a local area network (LAN), a wide area network (WAN), the Internet, and/or some other type of network or combination of networks, for example. The host 110 may connect to ARRAY-A over the network 150 using various technologies, such as Fibre Channel, SCSI (Small Computer System Interface), and/or iSCSI (Internet SCSI), for example. In some embodiments, any number of hosts 110 may be provided and may connect to the network 150 using any of the above protocols, some subset thereof, or other protocols besides those shown.

The host 110 is seen to include a set of processing units 112, a host bus adapter (HBA) 114, and memory 120. The set of processing units 112 includes one or more processing chips, cores, and/or assemblies. The HBA 114 connects to an internal bus (e.g., a PCI bus, not shown) within the host 110 and is configured to transmit IO requests to ARRAY-A and to RPA-A, e.g., using electronic and/or optical signals. The host 110 may include any number of HBAs 114. For example, one HBA may connect solely to ARRAY-A, while another may connect solely to RPA-A. The example shown is merely illustrative. In addition, the HBA 114 (or each such HBA) may be configured as a SCSI initiator, with ARRAY-A and RPA-A including their own SCSI adapters, which are configured as SCSI targets. In the example shown, ARRAY-A and ARRAY-B have SCSI target adapters 162 and 192, respectively, and RPA-A and RPA-B have SCSI target adapters 172 and 182, respectively.

The memory 120 of host 110 includes both volatile memory, such as RAM (Random-Access Memory), and non-volatile memory, such as one or more ROMs (Read-Only Memories), disk drives, solid state drives, and the like. The set of processing units 112 and the memory 120 together form control circuitry, which is constructed and arranged to carry out various methods and functions as described herein.

Also, the memory 120 includes a variety of software constructs realized in the form of executable instructions. When the executable instructions are run by the set of processing units 112, the set of processing units 112 are caused to carry out the operations of the software constructs. Although certain software constructs are specifically shown and described, it is understood that the memory 120 typically includes many other software constructs, which are not shown, such as an operating system, various applications, processes, and daemons.

As further shown in FIG. 1, the memory 120 of host 110 "includes," i.e., realizes by operation of software instructions, an application 122 and a multipathing (MP) driver 124. The application 122 may be any application that can write data to ARRAY-A. For example, application 122 may be a database front-end, where a corresponding database backend is stored in ARRAY-A. Application 122 may be a file system client, such as NFS (Network File System) or CIFS (Common Internet File System), which writes and accesses file-system data on ARRAY-A. Application 122 may be a web browser, that reads and writes pages or other content on ARRAY-A, or an email client, which stores email messages on ARRAY-A. These are merely examples, as application 122 may be any host application that stores data in ARRAY-A. Although a single application 122 is shown, host 110 may run any number of applications.

MP driver 124 manages connections between the host 110 and any number of SCSI targets, such as arrays and replication appliances. In an example, MP driver 124 is a filter driver that runs in an operating system kernel in memory 120. MP driver 124 may manage multiple paths (SCSI Initiator-Target-LUN, or I-T-L connections to each SCSI target), to provide redundant connections and to support failover. MP driver 124 may also collect and store performance data. Such performance data may include, for example, counts of IO write requests processed over designated time intervals, sizes of IO requests processed (e.g., in kilobytes), and the latency of IO requests, such as round-trip time between issuance of IO requests and receipt of acknowledgements that those IO requests are completed.

According to particular improvements hereof, the MP driver 124 further includes a replication splitter 130, an asynchronous fallback manager 132, a mode selector 136, a set of buffers 138, and a polling manager 144. Improvements further include separate IO monitors 140A and 140B for monitoring IO requests directed to ARRAY-A and to RPA-A, respectively, e.g., for measuring IO size and/or latency on a per-path basis, and separately organized IO metrics 142A and 142B, for storing metrics obtained by IO monitors 140A and 140B, respectively. One should appreciate that the MP driver 124 may include many additional components, whose functions are to support conventional multipathing functionality. Such components are omitted from FIG. 1 for the sake of clarity and are assumed to be within the knowledge of those skilled in the art. Also, although the splitter 130, asynchronous fallback manager 132, mode selector 136, buffer(s) 138, monitors 140A and 140B, metrics 142A and 142B, and polling manager 144 are shown as components of the MP driver 124, these components may alternatively be disposed outside the MP driver 124, i.e., elsewhere in the memory 120, or even in a separate computer (although using a separate computer would be inefficient). The MP driver 124 is a particularly suitable location for these components, given the position of the MP driver 124 in the IO path between the host application 122 and the HBA 114.

As further shown in FIG. 1, ARRAY-A and ARRAY-B include respective polling managers 164 and 194. Likewise, RPA-A and RPA-B include respective polling managers 174 and 184. In an example, the polling managers 164, 174, 184, and 194 are lightweight software components configured to respond to polling manager 144 in MP driver 124 and to provide instructions and/or data in response to polling requests.

In example operation, host application 122 runs, e.g., at the direction of a user, and issues multiple IO write requests (W-IO) each specifying data to be written to ARRAY-A. For example, requests W-IO may specify data in defined increments, such as 4 KB, 8 KB, etc., which data are directed to a particular data object or objects stored in ARRAY-A, such as one or more LUNs (Logical UNits), files, file systems, virtual machine disks, or any data object or objects that arrays are capable of storing. For this example, it is assumed that replication initially proceeds in synchronous mode, such that asynchronous fallback manager 132 has configured the splitter 130 and mode selector 136 (via mode 134) for synchronous replication.

Each write request W-IO issued by application 122 propagates to MP driver 124, where it encounters splitter 130. The splitter 130 splits the IO request W-IO to produce IO-A and IO-B, which are each functionally equivalent to W-IO. The splitter 130 sends IO-A on its way to ARRAY-A, e.g., via IO monitor 140A, HBA 114, and network 150. ARRAY-A stores the data specified in IO-A in a designated data object. Once ARRAY-A stores the data specified in IO-A, ARRAY-A sends back an acknowledgement ACK-A, indicating that that write is complete. The acknowledgement ACK-A propagates back to the host 110, typically following the same course as was used to send IO-A, but in reverse. Meanwhile, the splitter 130 also sends IO-B on its way to RPA-A, to be mirrored to SITE-B. This path takes IO-B to mode selector 136, to IO monitor 140B, to HBA 114, and through the network 150 to RPA-A. Replication appliance RPA-A receives IO-B and forwards IO-B to RPA-B, e.g., over the network 150 (dashed line 150A shows a logical connection). RPA-B, which operates at SITE-B (the replication site), may in turn forward IO-B to ARRAY-B for backup storage. For example, ARRAY-B contains versions of the same data object or objects that the application 122 writes on ARRAY-A. With the data specified in IO-B safely stored at SITE-B, SITE-B sends an acknowledgement ACK-B back to RPA-A, which then returns the acknowledgement to HBA 114, where the acknowledgement ACK-B propagates back to the splitter 130. Once the splitter 130 receives both acknowledgements ACK-A and ACK-B, the splitter 130 responds by returning an acknowledgement ACK-APP back to the application 122. The application 122 may then progress in performing its activities. When operating in synchronous mode, the splitter 130 manages each write IO request W-IO in this manner, waiting for both acknowledgements, ACK-A and ACK-B, before sending acknowledgement ACK-APP back to the application 122.

In some examples, RPA-B includes a non-volatile buffer (not shown), and returns acknowledgement ACK-B to RPA-A as soon as the arriving data are stored in the buffer, i.e., before destaging the data to ARRAY-B. In other examples, SITE-B holds back acknowledgements until the host data are actually placed in persistent structures of ARRAY-B. Embodiments hereof are intended to encompass both approaches, as well as variants thereof.

As IO-B propagates through MP driver 124, IO monitor 140B gathers performance data pertaining to IO-B, such as the size of the requested write and a timestamp that indicates the time at which IO-B encounters IO monitor 140B. When the acknowledgement ACK-B returns to the MP driver 124

(once the write is complete at SITE-B), the IO monitor 140B obtains another timestamp for IO-B. IO monitor 140B stores this performance data in metrics 142B, which maintains performance metrics for multiple IO requests sent to RPA-A. IO monitor 140A performs similar acts for IO-A, gathering performance data for IO size, time of departure, and time of return of each acknowledgement ACK-A from ARRAY-A, for each IO request directed to ARRAY-A.

From the collected performance data, MP driver 124 may generate various computed metrics, such as moving averages of IO size, IO latency, IO bandwidth, and so forth, keeping one set of metrics for IO requests to ARRAY-A and another set of metrics for IO requests to RPA-A. MP driver 124 may compute IO latency, for example, by subtracting departure time of an IO request from arrival time of the acknowledgement to that same request. The MP driver 124 may compute bandwidth, for example, by multiplying an accumulated value of IO size by an average IOPS (IO requests processed per second) for the same set of IO write requests. Alternatively, the MP driver 124 may compute bandwidth by dividing an accumulated value of IO size by an accumulated value of IO latency, again keeping separate metrics for IO requests to ARRAY-A and to RPA-A.

Over the course of multiple IO requests, MP driver 124 may arrive at accurate values for latency and bandwidth, which may inform the asynchronous fallback manager 132 in making changes in replication mode 134. For example, metrics 142A indicate a speed of processing write IO requests (instances of IO-A) to ARRAY-A and metrics 142B indicate a speed of processing write IO requests (instances of IO-B) to RPA-A. If the metrics 142B for bandwidth, latency, etc. for RPA-A are on par compared with comparable metrics 142A for ARRAY-A, the asynchronous fallback manager 132 may remain in synchronous mode or assume that mode if not there already. However, if metrics 142B are larger in comparison with metrics 142A, such that delays in waiting for acknowledgements from SITE-B would significantly reduce write performance, then asynchronous fallback manager 132 may switch to asynchronous mode. For example, asynchronous fallback manager 132 changes the state of mode 134, which directs the splitter 130 and the mode selector 136 to assume configurations consistent with asynchronous replication.

In asynchronous mode, the splitter 130 splits the IO requests IO-W from application 122 as before, but the splitter 130 and the mode selector 136 act differently. In this mode, the splitter 130 is configured to acknowledge the application 122 (via ACK-APP) in response to receiving an acknowledgement ACK-A from ARRAY-A. The splitter 130 is configured not to wait for an acknowledgement ACK-B from SITE-B. Thus, any delays in the path to SITE-B are irrelevant as far as acknowledgments ACK-APP to the application 122 are concerned. Also in this mode, the mode selector 136 passes each instance of IO-B to buffer(s) 138, which persistently store the data specified therein. In this manner, buffer(s) 138 accumulate a batch 139 of data from multiple instances of IO-B, which may extend, for example, over a minute or more in time. Once time expires, or some event occurs (such as the buffer(s) 138 reaching a high water mark), the buffer(s) 138 release the batch 139 of accumulated data to RPA-A, e.g., over the same path as described above. Batches 139 may be accumulated and sent to RPA-A in this manner indefinitely. For efficiency, the MP driver 124 preferably sends each batch 139 in a single, large transaction, or in a small number of related transactions. Upon receiving each batch 139, RPA-A forwards the batch to RPA-B, which destages the data in that batch 139 to locations in the replicated version of the data object.

IO monitors 140A and 140B continue to gather performance data and to produce metrics 142A and 142B. Likewise, asynchronous fallback manager 132 continues to monitor the metrics 142A and 142B and may automatically switch between synchronous and asynchronous modes depending on whether synchronous writes to RPA-A would significantly impact performance to ARRAY-A.

In some examples, performance data to RPA-A for instances of IO-B may become sparse when the MP driver 124 operates in asynchronous mode, as the sample size of individual instances of IO-B may shrink to zero. In this case, asynchronous fallback manager 132 may wait a period of time, such as a minute or more, and then switch back to synchronous mode. As new metrics 142B accumulate, the asynchronous fallback manager 132 may remain in synchronous mode, e.g., if the metrics 142B suggest little or no performance impact, or it may switch back to asynchronous mode, e.g., if the metrics 142B suggest a more significant impact on performance. The asynchronous fallback manager 132 may continue to switch back to synchronous mode every minute or so, effectively on a trial basis, and will either stay in synchronous mode or quickly switch back to asynchronous mode, depending on whether the slowed write performance to RPA-A has been resolved.

In an example, the set of buffers 138 is implemented as a so-called "swinging buffer." As is known, a swinging buffer includes a first buffer and a second buffer. As one buffer fills, the other buffer drains. For example, the first buffer may fill with data specified by new instances of IO-B. Once the first buffer becomes full, data for newly arriving instances of IO-B begin filling the second buffer. At the same time, the MP driver 124 drains the first buffer by sending its contents to RPA-A, e.g., in a batch 139. By the time the second buffer becomes full, the first buffer is again empty and can resume filling while the MP driver 124 drains the second buffer. The two buffers swing back and forth in this manner, trading roles, with one filling while the other drains.

In an example, the set of buffers 138 (whether provided as a swinging buffer or not), is implemented in non-volatile memory, such as flash memory, 3D XP (3-dimensional cross-point) memory, magnetic disk, or some other kind of non-volatile memory. The use of non-volatile memory promotes recovery following a power failure, system panic, or other event that would normally erase contents of volatile memory in the host 110. In an example, when the host 110 restarts after any such event, the host 110 polls ARRAY-A and/or RPA-A (using polling manager 144) to determine how to proceed with the contents of buffer(s) 138, e.g., whether to mirror the contents to the replication site, to discard the contents, or to perform some other function. In this fashion, ARRAY-A and/or RPA-A may control how replication is resumed after a host restart.

Figure 2:
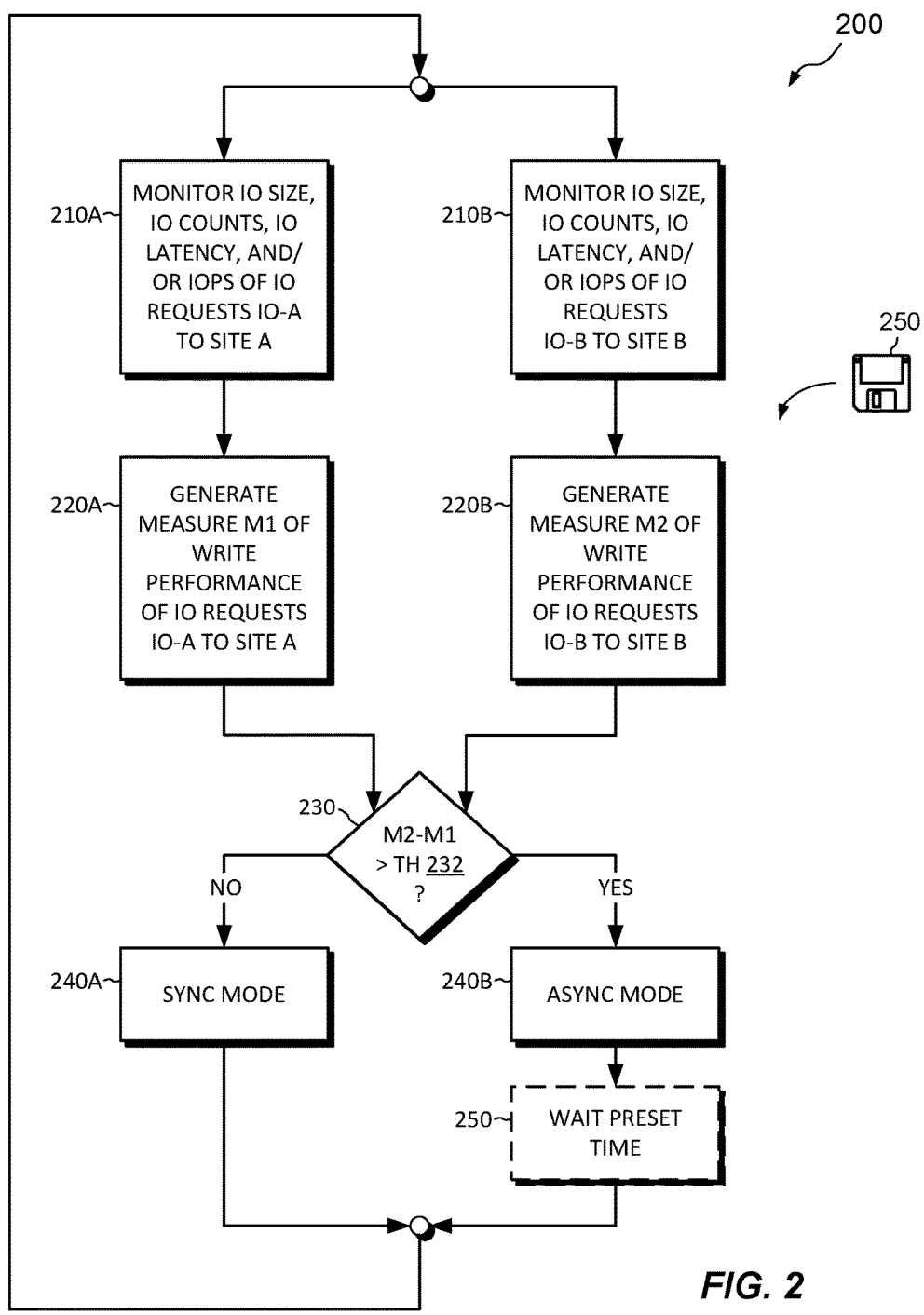
FIG. 2 is a flowchart showing an example method of automatically switching between synchronous and asynchronous replication modes.

FIG. 2 shows an example method 200 for automatically switching between synchronous and asynchronous replication. The method 200 is performed, for example, by the software constructs described in connection with FIG. 1, which reside in the memory 120 of the host computing system 110 and are run by the set of processing units 112.

At 210A, IO monitor 140A monitors IO size, IO counts, IO latency (e.g., round-trip time), and/or IOPS of IO requests IO-A dispatched to ARRAY-A.

At 220A, MP driver 124 generates a measure M1 of write performance to ARRAY-A. MP driver 124 may generate M1 using numerous techniques, with the following examples provided for illustration:

- By generating a moving average of latency measures of IO write requests IO-A over a window of time, e.g., as $1/N * \Sigma L_i$, for i=1 to N, where N is the number of IO requests IO-A processed during the time window and where $L_i$ is the round-trip latency of the i-th IO request IO-A processed during that time window. The window may advance for each IO request or in any increment;
- By generating a weighted moving average of latency measures of IO write requests IO-A during a window of time, e.g., as $1/N * \Sigma (W_i * L_i)$, wherein i, N, and $L_i$ are as indicated above and where $W_i$ is a weight proportional to the IO size of the i-th IO request IO-A;
- By measuring a moving average of IOPS over a window of time, e.g., as a count of all IO write requests IO-A processed during the window divided by the duration of the window;
- By measuring bandwidth as a product of IOPS, over a window of time, and corresponding IO sizes of the write requests IO-A arriving in that window of time and counted in determining the IOPS; and/or
- By using any combination of the foregoing techniques.

At 210B and 220B, IO monitor 140B performs acts similar to those performed by IO monitor 140A described in steps 210A and 220A above, and preferably in parallel with those steps. Here, however, steps 210B and 220B perform the monitoring and generating acts for IO write requests IO-B directed to RPA-A. Step 220B generates a measure M2 of write performance of IO requests IO-B to SITE-B, e.g., using any of the techniques described above for generating measure M1 for requests IO-A.

At 230, the MP driver 124, e.g., acting through the asynchronous fallback manager 132, performs a testing operation to determine whether synchronously mirroring host data slows down write performance by more than a predetermined amount. For example, step 230 compares M2 with M1 to identify a difference between M2 and M1 (e.g., M2−M1), and compares the difference to a threshold 232. If the difference exceeds the threshold 232, the asynchronous fallback manager 132 asserts asynchronous mode (step 240B). Otherwise, the asynchronous fallback manager 132 asserts synchronous mode (step 240A).

If operation proceeds to asynchronous mode at 240B, the method 200 may optionally impose a delay at 250. The delay defines a minimum period of time, such as 30 seconds, 1 minute, 2 minutes, etc., that asynchronous mode will remain in place before testing is resumed to determine again whether synchronous replication would degrade write performance by an amount that exceeds the threshold 232. The delay at 250 may be useful in cases where new performance data for IO requests IO-B is sparse or unavailable once asynchronous mode is started, as the delay may help to prevent chatter back and forth between replication modes.

After the prescribed delay at 250, or immediately following entry into synchronous mode at 240A, operation returns to parallel steps 210A and 220A, where the above-described steps are repeated, e.g., in a continuous loop. One should appreciate, however, that steps 210A and 210B may be performed in a continuous or semi-continuous manner, e.g., at regular intervals.

Figure 3:
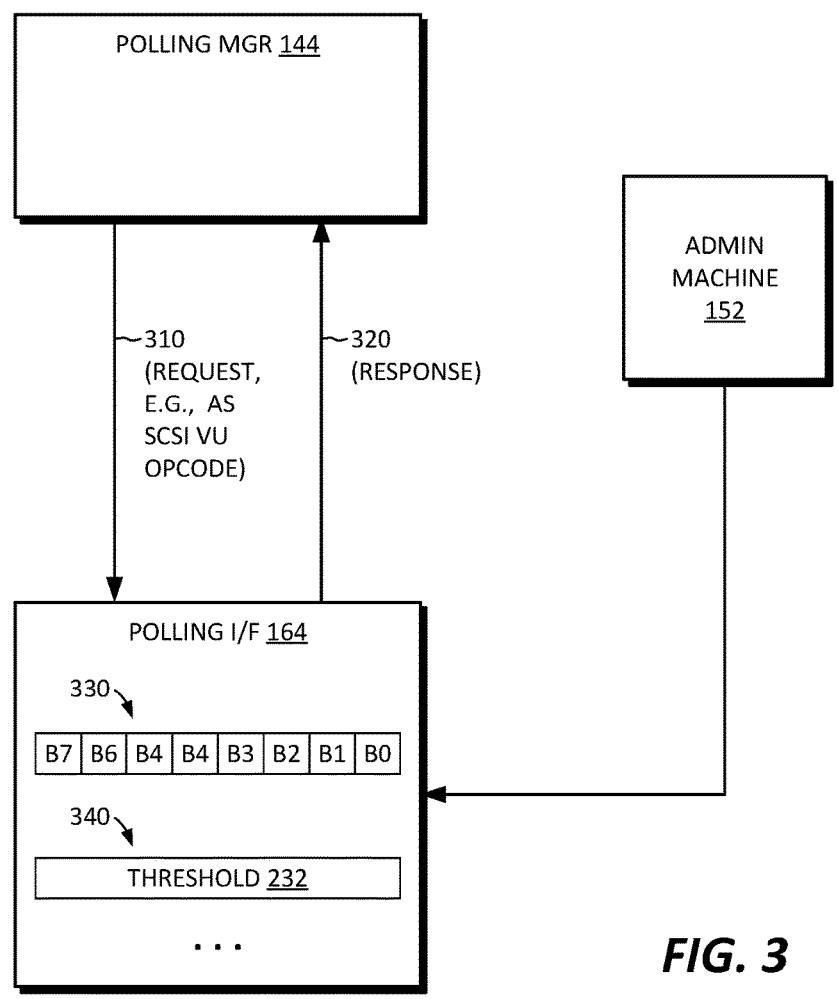
FIG. 3 is a block diagram of an example polling interface established between the host computing device and one or more arrays and/or replication appliances.

FIG. 3 shows an example communication interface by which data storage administrators can send instructions and/or data to the host computing device 110, or to any number of such host computing devices, to affect their behavior. The illustrated example shows polling interface 164 on ARRAY-A, but the principles described herein may apply to any array (e.g., to ARRAY-A and/or ARRAY-B) and to any replication appliance (e.g., to RPA-A and/or RPA-B).

Administrative machine 152 may send instructions and/or data over the network 150 to ARRAY-A. The polling interface 164 on ARRAY-A accesses the instructions and/or data that the administrative machine 152 has sent, with such instructions and/or data shown within polling interface 164 as data elements 330 and 340. The administrative machine 152 may provide any number of data elements.

In an example, data element 330 is provided as a single byte having multiple bits, e.g., bits B0 through B7. Each of bits B0 through B7 may designate a particular instruction. For example, bit B0 may designate whether the splitter 130 on host 110 (or on multiple hosts) should be enabled for splitting or disabled, such that it always operates as a pass-through element without mirroring IO requests. Bit B1 may designate whether the MP driver 124 should operate in synchronous mode, regardless of any degree to which synchronous mirroring may slow down write performance. Bit B2 may designate whether the MP driver 124 should operate in asynchronous mode, also regardless of performance. Bit B3 may designate whether to discard the contents of buffer 138 following a power cycling of host 110 or to ship the data to the replication site. Other bits may designate other functions. These are merely examples.

Also as shown, data element 340 provides a threshold 232, i.e., the same threshold that is used in determining the replication mode in method 200. Thus, administrators may provide threshold 232 as a user-adjustable parameter.

To access data elements 330 and 340, polling manager 144 (FIG. 1) sends a polling request 310 to the polling interface 164. In an example, the polling request 310 is a SCSI instruction, which may be provided as a vendor-unique, read-like opcode within a range of opcodes that the SCSI standard supports for vendor-unique commands. In some examples, a single, vendor-unique SCSI command specifies a read of both data elements 330 and 340, or of all data elements available for reading. In other examples, different vendor-unique SCSI commands are provided for accessing respective data elements or groups of data elements.

In response to polling request 310, polling interface 164 replies with polling response 320, which includes the requested data elements (e.g., all data elements or any selected ones). Upon receiving the polling response 320, the polling manager 144 communicates the contents of the returned data element(s) to the relevant components in the MP driver 124, such as the asynchronous fallback manager 132 and/or other management components. The MP driver 124 responds to the returned data elements by adjusting its configuration and/or operation. For example, the MP driver 124 may turn off the splitter 130, may assume synchronous mode regardless of performance, may assume asynchronous mode regardless of performance, may discard the contents of buffer 138, and/or may perform any other functions as specified in polling response 320. In addition, the MP driver 124 may convey a new value of threshold 232 to the asynchronous fallback manager 132, to be used going forward in determining replication mode.

Although the illustrated example is directed to polling of ARRAY-A, the same principles apply to other arrays and to replication appliances. One should appreciate that the movement of replication functionality from the array to the host, as specified herein, might involve a loss of control by the data storage administrator over replication activities. The polling manager 144 helps to avoid such loss of control, by enabling an administrator to place instructions or other data in an array or replication appliance, which are then transmitted to the host 110 when polling is performed. In this manner, the administrator retains control over replication activities, even though such activities are decentralized and dispersed across hundreds or thousands of hosts.

Figure 4:
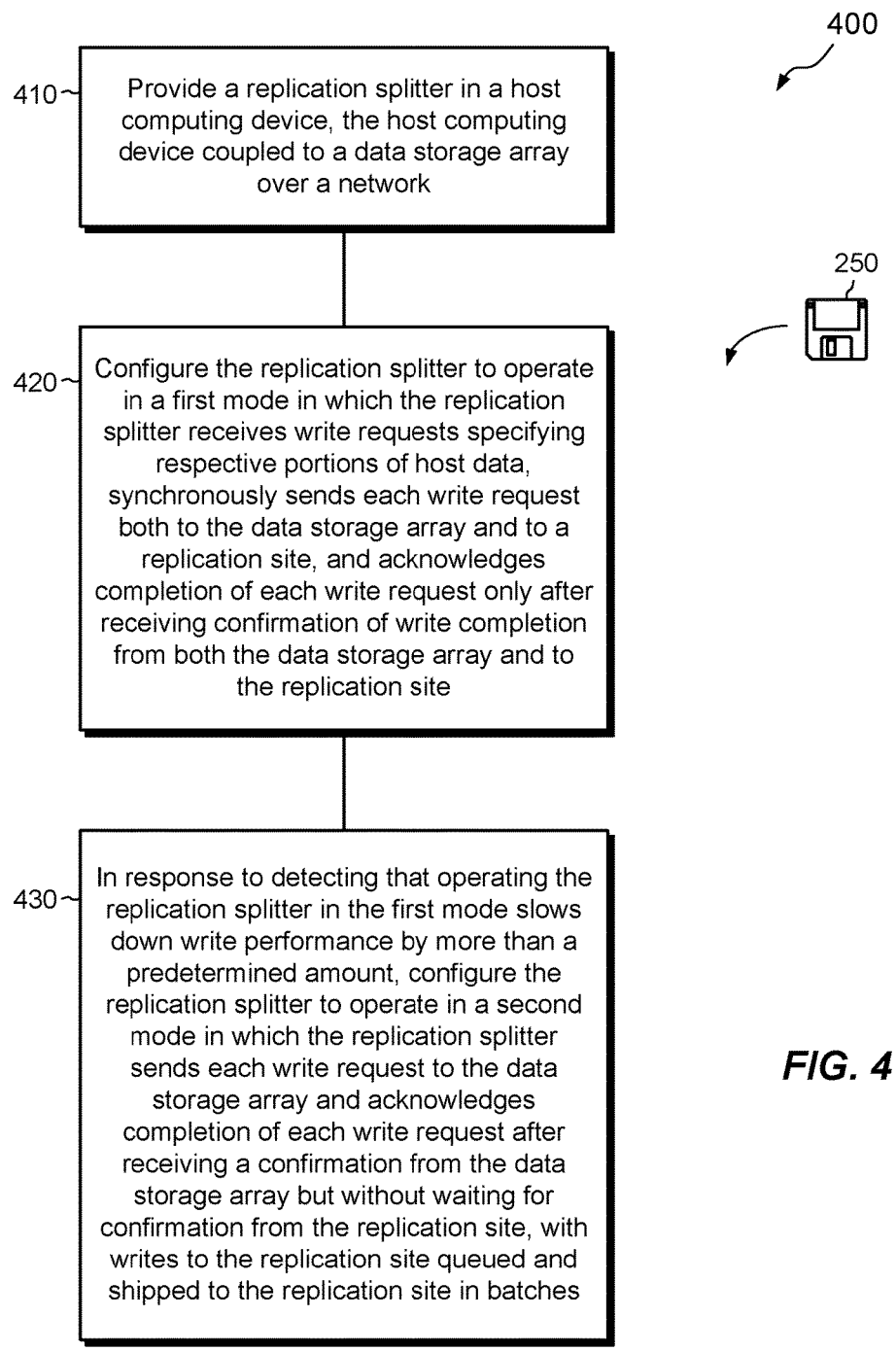
FIG. 4 is a flowchart showing an example method of storing host data in the environment of FIG. 1.

FIG. 4 shows an example method 400 that may be carried out in connection with the environment 100. The method 400 is typically performed by the software constructs described in connection with FIG. 1, which may reside in the memory 120 of the host computing device 110 and are run by the set of processing units 112. The various acts of method 400 may be ordered in any suitable way. Accordingly, embodiments may be constructed in which acts are performed in orders different from that illustrated, which may include performing some acts simultaneously.

At 410, a replication splitter 130 is provided in a host computing device 110. The host computing device 110 is coupled to a data storage array 160 (ARRAY-A) over a network 150.

At 420, the replication splitter 130 is configured to operate in a first mode in which the replication splitter 130 receives write requests (e.g., IO-W) specifying respective portions of host data, synchronously sends each write request both to the data storage array (ARRAY-A) and to a replication site (SITE-B, via RPA-A), and acknowledges completion of each write request (via ACK-APP) only after receiving confirmation of write completion from both to the data storage array and to the replication site.

At 430, in response to detecting that operating the replication splitter 130 in the first mode slows down write performance by more than a predetermined amount, such as the threshold 232, the replication splitter 130 is configured to operate in a second mode in which the replication splitter 130 sends each write request IO-W to the data storage array and acknowledges completion of each write request after receiving a confirmation (ACK-A) from the data storage array but without waiting for confirmation from the replication site (SITE-B). Writes to the replication site in this mode are queued (e.g., in buffers 138) and sent to the replication site in batches 139.

An improved technique has been described for storing host data, which includes operating a replication splitter 130 in a host computing device 110. The host computing device 110 runs an application monitors write performance from the application to both a data storage array 160 and a replication site (SITE-B). If the monitored performance indicates that writes to the replication site would not significantly slow down the application, the replication splitter 130 operates in synchronous mode, in which the splitter 130 waits to acknowledge writes IO-W from the application 122 until it receives acknowledgements (ACK-A and ACK-B) from both the data storage array and the replication site. However, if the monitored performance indicates that writes to the replication site would significantly slow down the application 122, the replication splitter operates in asynchronous mode, in which the splitter 130 acknowledges writes from the application (ACK-APP) as soon as it receives acknowledgements (ACK-A) that the data storage array has completed those writes. The splitter 130 does not wait for acknowledgements from the replication site before acknowledging the application 122.

Having described certain embodiments, numerous alternative embodiments or variations can be made. For instance, embodiments have been described that involve replication appliances. These are merely examples, however, as other embodiments may omit such appliances.

Also, embodiments have been described that involve particular arrangements of components within the MP driver 124. One should appreciate, however, that these components are provided by way of example and that specific implementations may vary in their detail.

Further, although embodiments herein describe a type of synchronous replication in which the IO requests are sent to the storage array and to the replication site effectively in parallel, synchronous replication may also be performed in series, e.g., with the splitter 130 holding back instances of IO-A until it receives confirmation from the replication site that respective instances of IO-B have been stored. The splitter 130 releases the instances of IO-A after receiving such confirmations, with each instance of IO-A propagating to ARRAY-A only after the write is complete at the replication site. One should appreciate that the principles described herein apply equally well to both parallel and series synchronous replication.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 250 in FIGS. 2 and 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of storing host data, the method comprising:
    providing a replication splitter in a host computing device, the host computing device coupled to a data storage array over a network;
    configuring the replication splitter to operate in a first mode in which the replication splitter receives write requests specifying respective portions of host data, synchronously sends each write request both to the data storage array and to a replication site, and acknowledges completion of each write request only after receiving confirmation of write completion from both the data storage array and to the replication site; and
    in response to detecting that operating the replication splitter in the first mode slows down write performance by more than a predetermined amount, configuring the replication splitter to operate in a second mode in which the replication splitter sends each write request to the data storage array and acknowledges completion of each write request after receiving a confirmation from the data storage array but without waiting for confirmation from the replication site, with writes to the replication site queued and shipped to the replication site in batches.

2. The method of claim 1, further comprising, after an amount of time has passed since configuring the replication splitter to operate in the second mode, configuring the replication splitter to operate again in the first mode.

3. The method of claim 2, further comprising, after configuring the replication splitter to operate again in the first mode:
    performing a testing operation to determine whether synchronously mirroring host data slows down write performance by more than the predetermined amount; and
    in response to the testing operation indicating that synchronously mirroring host data does slow down write performance by more than the predetermined amount, switching the replication splitter back to the second mode.

4. The method of claim 3, wherein detecting that synchronously mirroring host data slows down write performance by more than the predetermined amount includes:
    generating a first metric by measuring write performance between the host computing device and the data storage array;
    generating a second metric by measuring write performance between the host computing device and the replication site;
    comparing the first metric with the second metric to identify a difference value; and
    comparing the difference value with the predetermined amount to determine that the difference value exceeds the predetermined amount.

5. The method of claim 4, wherein comparing the first metric with the second metric to identify the difference value includes subtracting the first metric from the second metric.

6. The method of claim 3, wherein the predetermined amount is user-adjustable.

7. The method of claim 6, wherein the method further comprises polling, by the host computing device, the data storage array to obtain replication settings pertaining to replication of host data.

8. The method of claim 7,
    wherein the host computing device includes a SCSI (Small Computer System Interface) initiator,
    wherein the data storage array includes a SCSI target, and
    wherein polling the data storage array is performed by sending a SCSI instruction from the SCSI initiator in the host computing device to the SCSI target in the data storage array.

9. The method of claim 8, wherein the SCSI instruction includes a read-like opcode provided in a vendor-unique SCSI command.

10. The method of claim 9, wherein the replication settings obtained by polling include an update to the predetermined amount, and wherein the method further comprises applying, by the host computing device, the update to the predetermined amount going forward in detecting whether synchronously mirroring host data slows down write performance by more than the predetermined amount.

11. The method of claim 7, wherein the method further comprises polling, by the host computing device, a replication appliance coupled between the host computing device and the replication site to obtain replication settings from the replication appliance.

12. The method of claim 11,
    wherein the host computing device includes a second SCSI initiator,
    wherein the replication appliance includes a SCSI target, and
    wherein polling the replication appliance is performed by sending a vendor-unique SCSI command from the second SCSI initiator in the host computing device to the SCSI target in the replication appliance.

13. The method of claim 12, wherein the replication settings obtained by polling the replication appliance include a setting to change an operating condition of the replication splitter, the host computing device then changing the operating condition of the replication splitter in response to the setting from the replication appliance.

14. The method of claim 13, wherein the replication settings obtained by polling the replication appliance include a setting to direct the replication splitter to stop splitting host data and to pass host data to the data storage array without mirroring.

15. The method of claim 13, wherein the replication settings obtained by polling the replication appliance include a setting to configure the replication splitter to operate in the one of the first mode and the second mode and to maintain operation in that mode regardless of any degree to which synchronously mirroring host data slows down write performance.

16. The method of claim 13, wherein, when operating in the second mode, the host computing device asynchronously mirrors portions of host data to the replication site in batches, each batch including multiple portions of host data received at respective times, and wherein operating the replication splitter in the second mode includes storing batches of host data in a set of non-volatile buffers in the host computing system.

17. The method of claim 16, wherein the set of non-volatile buffers are realized using at least one of (i) flash storage and (ii) 3D XP storage.

18. The method of claim 17, wherein the set of non-volatile buffers includes a pair of swinging buffers in which, at any point in time, one buffer operates to fill with data specified in TO requests while another buffer operates to drain its contents, with the host computing device sending drained contents to the replication site.

19. The method of claim 17, further comprising, after the host computing device experiences a restart following a power cycling, polling the replication appliance to determine whether to discard host data stored in the set of non-volatile buffers.

20. A host computing device, comprising control circuitry that includes a set of processing units coupled to memory, the control circuitry constructed and arranged to:
provide a replication splitter in a host computing device, the host computing device coupled to a data storage array over a network;
configure the replication splitter to operate in a first mode in which the replication splitter receives write requests specifying respective portions of host data, synchronously sends each write request both to the data storage array and to a replication site, and acknowledges completion of each write request only after receiving confirmation of write completion from both the data storage array and to the replication site; and
in response to a detection that operating the replication splitter in the first mode slows down write performance by more than a predetermined amount, configure the replication splitter to operate in a second mode in which the replication splitter sends each write request to the data storage array and acknowledges completion of each write request after receiving a confirmation from the data storage array but without waiting for confirmation from the replication site, with writes to the replication site queued and shipped to the replication site in batches.

21. A computer program product including a set of non-transitory, computer-readable media having instructions which, when executed by control circuitry of a host computing device, cause the control circuitry to perform a method for storing host data, the method comprising:
providing a replication splitter in a host computing device, the host computing device coupled to a data storage array over a network;
configuring the replication splitter to operate in a first mode in which the replication splitter receives write requests specifying respective portions of host data, synchronously sends each write request both to the data storage array and to a replication site, and acknowledges completion of each write request only after receiving confirmation of write completion from both the data storage array and to the replication site; and
in response to detecting that operating the replication splitter in the first mode slows down write performance by more than a predetermined amount, configuring the replication splitter to operate in a second mode in which the replication splitter sends each write request to the data storage array and acknowledges completion of each write request after receiving a confirmation from the data storage array but without waiting for confirmation from the replication site, with writes to the replication site queued and shipped to the replication site in batches.

\* \* \* \* \*